Aug. 11, 1936.    H. A. FARRAND    2,050,941
RULE
Filed Oct. 4, 1933
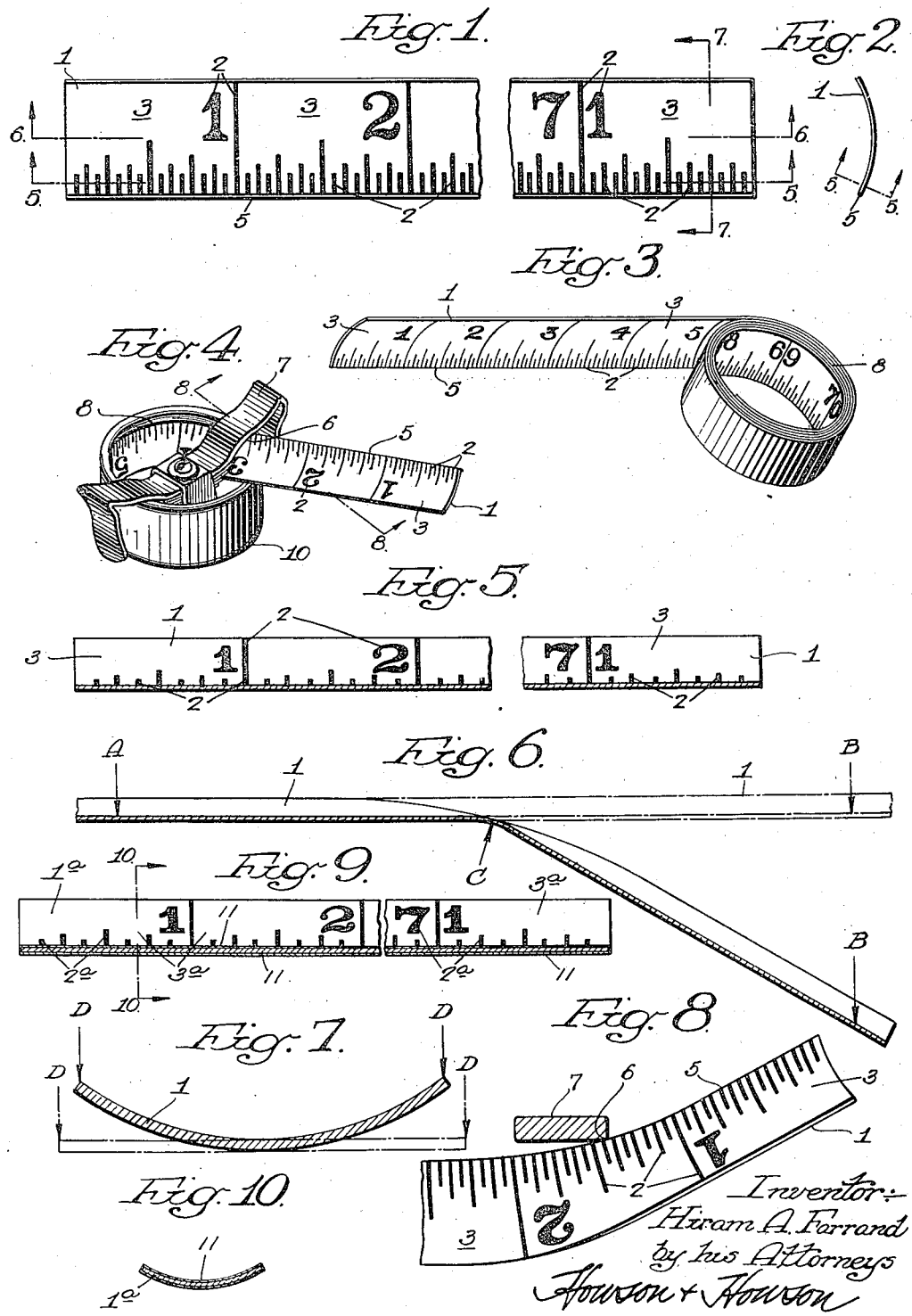
Inventor:
Hiram A. Farrand
by his Attorneys
Howson & Howson Patented Aug. 11, 1936

2,050,941

UNITED STATES PATENT OFFICE 2,050,941

RULE

Hiram A. Farrand, Berlin, N. H., assignor to Hiram A. Farrand, Inc., Berlin, N. H., a corporation of New Hampshire Application October 4, 1933, Serial No. 692,185

4 Claims. (Cl. 33—137)

This invention relates to coilable metal rules and particularly to those of the type having a concavo-convex cross-section, commonly known in the art as "flexible rigid" rules. Rules of this type are preferably used with a separable or permanently attached coiling device, commonly known as a container, in which the rule reposes in a compact coiled form when out of use.

The prior art relating to coilable metal rules consists of flexible steel measuring tapes of the flat cross-sectional type and coilable concavo-convex rules, such as those disclosed in my prior U. S. Patents No. 1,402,589 and No. 1,828,401. These prior art instruments each include a base composed of a ribbon of wafer-thin spring steel capable of a considerable degree of flexibility, in order that any portion adjacent one end of the rule, or the entire length of the rule might be wound into a compact coil when not in use.

In order to serve as a graduated measure, the thin steel base of each rule functions as a carrier for a system of graduations and associated figures constituting a measuring scale. Except in those instances where sheathings composed of fabric or metal enveloping or superimposed on the metal base are employed, the division lines and figures of the scale form an integral portion of the base strip and, prior to the present invention, consisted of visible differences in the levels between adjacent areas of the superficial portion of the steel ribbon itself.

To attain the noted difference in level, the original smooth surface of the wafer-thin strip was modified by removing a layer of metal from those portions of the surface lying between the several lines of the scale and figures, leaving the lines and figures standing at the original level of the strip with the intervening background areas in depressed relation thereto.

The method employed in removing the metal consisted of engraving or etching, the latter process being the one commonly applied to the wafer-thin steel of coilable measures.

The practice above referred to originated in the earlier art relating to the manufacture of flat steel measuring tapes and at the inception of the later art relating to the production of coilable concavo-convex rules manufacturers having no precedent to follow other than that of the earlier flat rule art, employed the etching process for producing the markings on the newer type of rule strip.

The practice of etching-in the markings was eminently fitted to the purpose of making flat steel measuring tapes and quite satisfactory as a process so long as it was confined to that field, but, when this practice was transferred to the field of coilable concavo-convex rules, it was found to impair the efficiency of the product in a number of ways, for example, in addition to its resulting in an inferior order of legibility, it tended to reduce the stiffness of the rule all out of proportion to the amount of metal removed; it materially reduced the capacity of the structure to withstand repeated flexing; and it caused an inordinate amount of wear upon the guiding surfaces with which it came in contact, due to the differences in levels between the surfaces of the graduations and the intervening background areas producing a saw-like edge on the rule.

My above noted prior Patent No. 1,828,401 discloses an article and process which overcomes the above noted disadvantages of the etched and engraved types of rule strips by superimposing a metallic sheathing on the steel core or base of the rule and by forming omissions in the sheathing to produce the indicia of the rule by contrast between the color of the metal in the omissions and the color of metal of the sheathing surrounding the omissions. In this case the rule disclosed is composed of two or more superimposed and integrally united layers of differing metals or metals of different colors respectively.

The objects of my present invention are, to increase the amount of stiffness available in a given strip of steel, to increase the capacity of the rule to withstand repeated flexing, to reduce the amount of wear upon objects contacting with the edge of the rule strip moving into and out of its container, and to improve the permanent marking effects, without resorting to the production of omissions in the outermost of one or more dissimilar metallic sheathings applied to the steel base strip.

The construction of the rule and the manner in which the above noted objects are attained will be fully disclosed hereinafter, reference being had to the accompanying drawing, of which:

Fig. 1 is a plan view of the new rule involving my present invention and showing a completed, resilient, mono-metallic concavo-convex coilable rule of wafer-thin dimension, said figure being drawn to an enlarged scale;

Fig. 2 is an end view of the rule shown in Fig. 1;

Fig. 3 is a perspective view of a rule such as that of Fig. 1, showing one portion of the rule formed into a compact externally wound coil, similar to that formed within one type of container, and another portion shown in its normal longitudinally rectilinear state;

Fig. 4 is a perspective view showing the rule of Fig. 1 partly wound in an internally wound coil in another type of container.

Fig. 5 is a longitudinal section of Fig. 1 taken along lines 5—5 on Figs. 1 and 2 respectively, the line of vision being tangential to the curve of the transverse arch at the line of section whereby the scale marks and numerals are fore-shortened;

Fig. 6 is a longitudinal section taken along the line 6—6, Fig. 1, with one portion bent away from the normal rectilinear portion of the rule;

Fig. 7 represents a cross-section, greatly enlarged and taken along the line 7—7, Fig 1;

Fig. 8 is an enlarged fragmentary section taken on the line 8—8, Fig. 4, and showing an edge of the rule in contact with a guide member of the container;

Fig. 9 is a longitudinal sectional elevation of a sheathed rule strip embodying the principles of the present invention; and Fig. 10 is a transverse section taken on the line 10—10, Fig. 9.

In the drawing 1 represents a body of metal comprising the resilient concavo-convex structure, 2 represents dark colored spaces or indicia employed to indicate the division lines of the scale and the accompanying numerals on a contrasting colored background 3, although a reverse arrangement may be employed wherein the dark areas represent the background and a contrasting color represents the indicia.

The rule strip 1 preferably consists of a body of wafer-thin high carbon spring steel possessing the usual thin surface tension skin resulting from conventional cold rolling, and tempered to suit the duty which it is called upon to perform, such as repeated flexing in ordinary usage, distortion due to accidental displacement, requirements of processing, and a certain amount of abuse, hence, the temper of the strip 1 must be such as to avoid brittleness, yet it must, at the same time, be of a nature to provide sufficient resiliency in the strip to permit the strip to suffer no permanent loss of shape under the severe stresses to which it is commonly subjected in bending. The temper ordinarily adopted for this purpose is that which is known as the "blue temper" of high carbon steel.

The structural dimensions which I commonly employ for a seventy-two inch rule include a width of 5/8" and a thickness of .0050", the latter dimension being of the greatest possible uniformity throughout, and any variation must not be of an abrupt character at any point along the length or across the width of the strip of which the rule is composed.

The minimum radius of the transverse arch of the structure 1, which may be maintained without permanent change in shape upon flexing, depends upon the quality of the steel, as well as upon its thickness and temper. In my preferred practice, using high-carbon blue tempered steel as noted above, I have been able to maintain a minimum curvature having a radius of approximately 5/8", which gives a rise of arch approximating .080" in height. The above dimensions are herewith given for illustrative purposes only and to indicate that a fine balance of all parts and dimensions are essential in the production of a successful coilable concavo-convex rule when made of resilient wafer-thin metal. Where other sizes and lengths are desired, the balance must be adjusted to suit the conditions.

As has been indicated, the legibility of etched and engraved markings was inferior and the abrupt variation in thickness which resulted from such processes of marking was injurious to the structure itself and to surrounding or contacting objects. Accordingly, my conception differs therefrom in devising a means whereby the marking effect would still be an integral portion of the mono-metallic structure, without resorting to any perceptible difference in the surface levels or in any wise disturbing the outer fibers of the metal body. This I accomplish in the following manner:

The strip 1 is capable of attaining more than one coloration, which, in the case of steel, may vary over its surface from a white to a deep blue or black color according to the nature of the superficial film which alters and reflects the rays of light. This film may be in the form of an oxide as the result of heat treatment, or may be some other coloration due to the application of a chemical reagent. By utilizing this variation in color, I am able to so arrange the distribution of the light and dark colorations as they appear upon the metal surface to form a contrast between adjacent areas on the surface of the strip, whereby I obtain the necessary markings of the scale and figures without disturbing even so much as the skin of the strip. This is possible by reason of the fact that, as is well known in the art, the superficial temper color of steel is of lesser thickness than the surface tension skin of the metal.

The process which I prefer to employ, although other methods may be used without departing from the spirit of my invention, is to first provide a spring strip already formed into a concavo-convex shape and tempered to the deep blue color, characteristic of the grade of temper which I find best adapted to the purpose. Upon the surface of this spring I deposit, temporarily, a substance which is resistant to a reagent which I afterward apply. This resistant substance is applied over only such portion of the surface as I desire to remain dark, as the areas 2 in the drawing. This resistant substance (frequently called "resist") may be of asphaltum, or a specially prepared ink which may be printed directly upon the surface of the steel in a way to adhere to the strip 1 during the subsequent operations. In some cases, ordinary printer's ink may be utilized for the purpose, since the duration of exposure to the reagent employed, is too brief to have any material effect upon the resist.

In the old process of etching, where resists were also employed, special provision had to be made for prolonged submersion in strong acid.

In my present case the strip, after the resist has been deposited in the desired manner and dried, is immersed in a dilute pickle. For this purpose I prefer to employ a very dilute solution of hydrochloric or sulphuric acid although satisfactory results may be obtained with other chemical solutions; the only requirement being that the action of the acid be slow enough to be subject to easy control, in order that it may have no injurious effect upon the fibers of the steel with which it comes in contact. For example, a pickle having one part acid to fifteen parts water and a submersion of approximately two minutes in fresh pickle gives satisfactory results.

The effect of the chemical reagent is to alter the color of the steel surface from blue to white.

When this is accomplished (care being taken to avoid leaving the strip remaining in the bath long enough to affect the fibers of the steel) the strip is removed and thoroughly rinsed in running water and afterward immersed in a solution of lime water or other chemical equivalent to arrest any further action which might result if any residual acidity were to remain on the strip.

After drying the strip, the resist may be removed, or it may be left in place to wear off in use, since the presence of the resist, which is usually black, has no injurious effect and when worn off, the underlying permanent blue temper color of the steel in the scale and figures will remain as an integral portion of the rule structure, making the indicia permanent.

The practice of etching flat tape measures reduced the thickness of the steel strip anywhere from one-half to one thousandth part of an inch up to one thousandth part, or more. This practice when applied to concavo-convex strips produced a reduction in thickness ranging from ten to twenty percent of the original thickness of the steel composing the rule. It has been proven, by actual test, that the etching of a concavo-convex spring strip to a depth of twenty percent reduces the stiffness anywhere from thirty-six to fifty percent, or more, a reduction of a magnitude entirely unpredictable from previous experience in the related art.

In the case of a flat strip, the form assumed upon the application of a bending force, is that of curving throughout its entire length, with the degree of curvature varying according to the amount of force applied. In a concavo-convex strip, the structure resists bending up to a certain definite amount of applied force, whereupon it suddenly flexes or buckles with the bend taking place within a limited locality and with the remainder of the rule retaining its normal longitudinally rectangular state. This reaction is illustrated in Figs. 6 and 7 of the drawing.

As will be understood by reference to the drawing, the reaction which takes place before buckling is one in which the transverse shape is flattened, i. e. the strip is changed from a curved to a flat cross section wherein during the first stage of applied stress at relatively spaced points longitudinally of the strip, indicated at A and B, against a counter force applied at an intermediate point C, the reaction takes place in a plane which is perpendicular to the length of the rule strip in a plane transverse of the strip. Fig. 7 illustrates this first reaction. At the inception of the stress, the transverse shape is in the curved form of a segment. By reason of the resolution of the applied forces, a pressure is exerted in the direction of the arrows at D, D, while this force is opposed by a pressure in the opposite direction at C. The result is a flattening of the normally curved transverse shape culminating in the rectangular transverse shape shown by the broken lines in Fig. 7. At that stage the rule bends suddenly, opposed only by the longitudinal resistance of the flat strip to bending. Following this analysis, it will be seen that the strip should resist bending in a definite relation to its thickness rather than according to the height, or rise, of the arch.

Nevertheless, it has been demonstrated by means of numerous tests, that even then, a strip which has been altered in thickness by the process of etching, oftentimes suffers a loss of resistance greater than may be calculated according to the theory of the strength of materials. Presumably, this is due either to some weakening effect caused by the chemical solvent applied to the fibers of the steel or to the removal of the outermost and strongest fibers of the structure.

By my invention, I am able to retain substantially all of the original body of the strip and thereby attain in such cases as uncalculable degree of strength which is out of proportion to the amount of material thus conserved.

Owing to the fact that a concavo-convex rule of this description is essentially coilable and must withstand numberless flexings in either direction in the course of its customary performance and must, also, be subjected to a certain amount of abuse, it is quite important that the structure shall have the greatest possible capacity for enduring such strains. It is important to note, therefore, that in flexing a concavo-convex rule, the reaction is sudden, whereas in the flat tape of the prior art, the bending takes place gradually from straight to whatever arc it may finally assume. In a concaved rule, the strains are so quickly impressed upon the fibers that the molecules have comparatively little time to readjust themselves, so that the effect is a shock which takes on the nature of an impact. This observation is quite significant since it has been found that the punishment inflicted upon the fibers of a concavo-convex spring strip by bending, is vastly greater than anything visited upon the fibers of a flat spring strip operating under the same conditions.

When adapting such springs to the purposes of measuring, it is necessary to supply a system of numbers and scale divisions; and when this is done in the case of the concaved structure, by means of the old process of etching, complications arise which were not obvious. It has been established by numerous tests that to produce the markings by the process of etching, results in a much further reduction in the capacity of the strip to withstand repeated flexure. In fact, it has been proved that the capacity to withstand flexure without rupture is reduced to something like forty percent of the capacity of an unetched concaved spring strip made from the same steel strip, alike in every other respect. Here indeed was a hidden danger which was beyond the knowledge of any one versed in the earlier art of flat measuring tapes. By my invention, I avoid removing any perceptible portion of the original body of the spring strip and produce the necessary markings, thereupon, without disturbing the fibers. In so doing, I have been able to preserve the greater portion of that endurance capacity which remained in the strip after it had been converted into concavo-convex structure.

In my invention I am able to carry the division lines down to the very edge of the strip, and thus retain all possible advantage in the reading of a measurement. In so doing, I do not create any irregularity in the edge structure and am able to avoid the wear which is associated with the use of an etched edge.

Figs. 4 and 8 illustrate the arrangement of metal along the edges of my invention and also show it in contact relation with the guiding member 7 of a container. It will be seen that the smooth uniform edge 5 is able to slide over the edge 6 of the guide 7 presenting no perceptible irregularity, whatsoever.

Thus it will be seen that I have produced in a coilable concavo-convex rule, a wafer-thin mono-metallic structure which is uniform in thickness throughout; that I have produced permanent and highly efficient contrasting marking effects which are in no sense dependent upon any visible difference in relative surface elevations of adjacent areas of the face of the rule; and that these contrasting areas are an integral portion of the original steel of the strip and inseparable therefrom.

Figs. 9 and 10 illustrate a rule strip of uniform thickness throughout its entirety including superficial scale indicia and intervening background areas, wherein the base strip 1a is completely enveloped by an outer sheathing 11 composed of a suitable metal, such, for example, as copper and silver capable of oxidation, to form a contrast between the scale indicia 2a and background 3a.

In this case one or the other of the areas 2a or 3a may be stopped-off by a resist, in the manner noted above, and the strip then subjected to any suitable process of oxidation, whereby the non-stopped or exposed area will become superficially colored to create the desired contrast, or the stopped-off strip may be subjected to any suitable chemical process by which the color of the exposed area may be changed from the natural to some other color within the chromatic range peculiar to the particular sheathing metal employed.

I claim:

1. A concavo-convex rule strip of substantially uniform wafer-thin thickness throughout its entirety, and comprising a mono-metallic surface having a surface tension skin and depicting scale indicia and intervening background of which one is composed of an infinitesimally thin integrally united layer of oxide of the metal of which said surface tension skin is composed and wherein the thickness of the indicia-producing layer of oxide is less than the thickness of said surface tension skin.

2. A concavo-convex rule consisting of a mono-metallic base strip of substantially uniform wafer-thin thickness throughout its entirety, and having a surface tension skin on which is depicted scale indicia and intervening background of which one is composed of an infinitesimally thin integrally united layer of oxide of the metal of which the surface tension skin of said base strip is composed and wherein the thickness of the indicia-producing layer of oxide is less than the thickness of said surface tension skin.

3. A mono-metallic concavo-convex rule strip of substantially uniform wafer-thin thickness throughout its entirety, and having a superficial surface tension skin of minute thickness relatively denser than the metal of the interior of the strip with the superficial surface tension skin of at least one side of the strip affording a surface having depicted thereon scale indicia and intervening background of which one is composed of an integrally united layer of oxide of the metal of which the surface tension skin of the strip is composed and wherein the thickness of said layer of oxide is less than the thickness of said superficial skin.

4. A mono-metallic concavo-convex rule strip of substantially uniform wafer-thin thickness throughout its entirety, and having a superficial surface tension skin of minute thickness relatively denser than the metal of the interior of the strip with the superficial surface tension skin of at least one side of the strip affording a surface having depicted thereon scale indicia and intervening background of which one is composed of an integrally united layer of oxide of the metal of which the surface tension skin of the strip is composed and the other is formed of said metal devoid of said oxide at a difference in elevation therebetween of a measurement less than the thickness of said skin.

HIRAM A. FARRAND.